(12) United States Patent
Douglas et al.

(10) Patent No.: US 7,384,231 B2
(45) Date of Patent: Jun. 10, 2008

(54) BOGIE UNIT FOR SUSPENDED TRANSPORT OF A TREATMENT PLANT

(75) Inventors: Paul Douglas, Swadlincote (GB); Christopher William Wagstaffe, Swadlincote (GB)

(73) Assignee: Extec Screens and Crushers Limited, Derbyshire (GB)

( * ) Notice: Subject to any disclaimer, the term of this patent is extended or adjusted under 35 U.S.C. 154(b) by 381 days.

(21) Appl. No.: 10/475,566

(22) PCT Filed: Feb. 3, 2003

(86) PCT No.: PCT/GB03/00457

§ 371 (c)(1), (2), (4) Date: Oct. 22, 2003

(87) PCT Pub. No.: WO03/074324

PCT Pub. Date: Sep. 12, 2003

(65) Prior Publication Data

US 2004/0135343 A1    Jul. 15, 2004

(30) Foreign Application Priority Data

Mar. 6, 2002 (GB) .................................. 0205250.4

(51) Int. Cl.
*B60P 1/02* (2006.01)
(52) U.S. Cl. ..................................... 414/495; 280/441.2
(58) Field of Classification Search ................ 414/495, 414/435, 439, 546; 198/300; 254/2 B, 2 C; 280/441.2
See application file for complete search history.

(56) References Cited

U.S. PATENT DOCUMENTS

| 2,531,694 | A | * | 11/1950 | Larsen ........................ 414/469 |
| 3,156,484 | A | * | 11/1964 | Talbert ........................ 280/35 |
| 3,202,400 | A |   | 8/1965  | Cone |
| 3,285,449 | A | * | 11/1966 | Hand .......................... 414/498 |
| 3,505,767 | A | * | 4/1970  | Fyle, Jr. ..................... 52/143 |

(Continued)

FOREIGN PATENT DOCUMENTS

DE          1247875          8/1967

(Continued)

*Primary Examiner*—Saul J. Rodriguez
*Assistant Examiner*—Michael Lowe
(74) *Attorney, Agent, or Firm*—Kirton & McConkie; Evan R. Witt

(57) ABSTRACT

A wheeled bogie unit is engageable with one end of a chassis of a treatment plant to support that end of the chassis above the ground for the suspended transport of the plant. The bogie unit has a chassis, at least one wheel set supporting the chassis, a lifting cradle mounted on the chassis and having a projecting end which is engageable with the end of the plant chassis, a support and guide surface provided on the projecting end of the cradle which is engageable with a lifting surface provided on the end of the plant chassis, in order to suspend one end of the plant chassis above the ground, and a slide mounting the cradle on the bogie chassis for relative slidable movement between a lowered position and a raised lifting position. In the lowered position, the end of the plant chassis is standing on the ground adjacent thereto. In the raised lifting position, the end of the plant chassis is lifted off the ground and is supported by the support and guide surface of the lifting cradle.

8 Claims, 3 Drawing Sheets

U.S. PATENT DOCUMENTS

| | | | |
|---|---|---|---|
| 3,520,430 A * | 7/1970 | Dunbar | 414/458 |
| 3,645,559 A * | 2/1972 | Stafford, Jr. | 280/418.1 |
| 3,767,071 A * | 10/1973 | Harbers | 414/812 |
| 4,746,260 A * | 5/1988 | Norvell | 414/460 |
| 5,013,209 A | 5/1991 | DeMichele et al. | |
| 5,059,083 A * | 10/1991 | Triplett | 414/458 |
| 5,460,332 A * | 10/1995 | Frick | 241/101.74 |
| 6,311,821 B1 | 11/2001 | Douglas | |
| 6,821,066 B2 * | 11/2004 | Wehrli | 410/32 |
| 6,957,822 B2 * | 10/2005 | Douglas et al. | 280/416.1 |
| 2001/0020656 A1 | 9/2001 | Frick | |

FOREIGN PATENT DOCUMENTS

| | | |
|---|---|---|
| FR | 2463702 | 2/1981 |
| FR | 2647731 | 12/1990 |

* cited by examiner

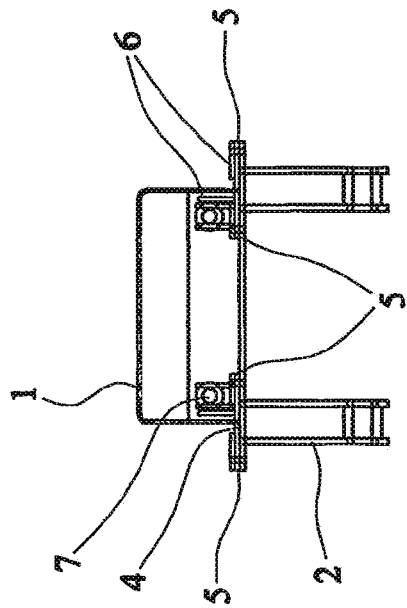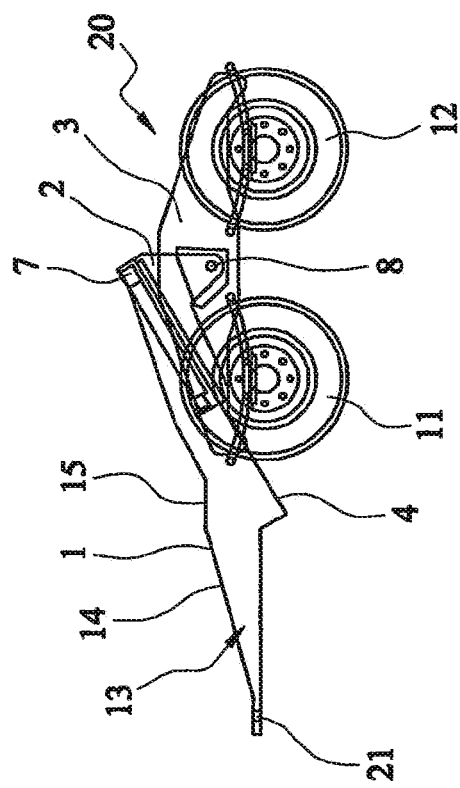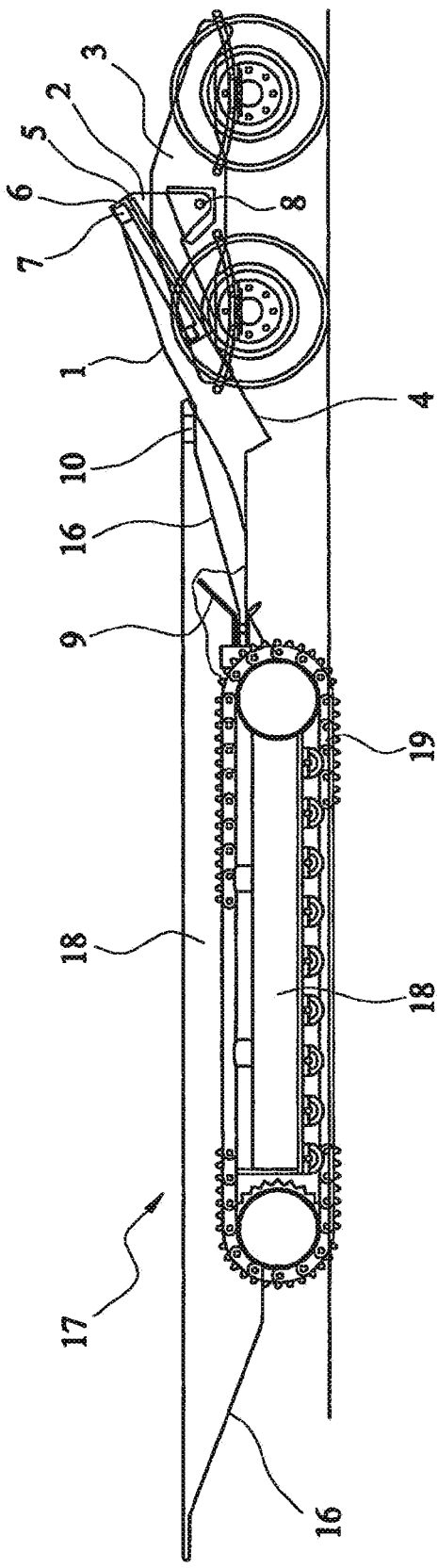

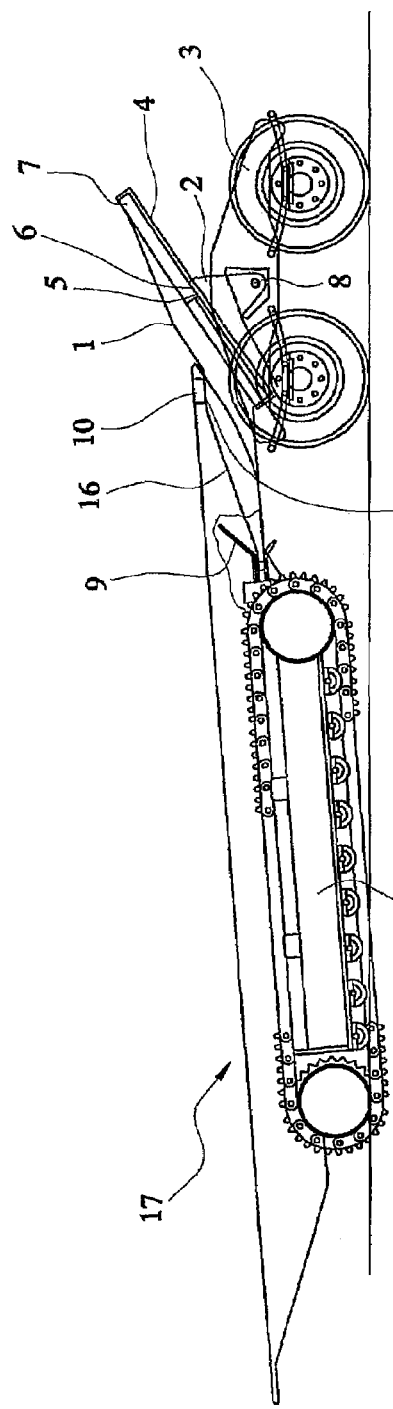
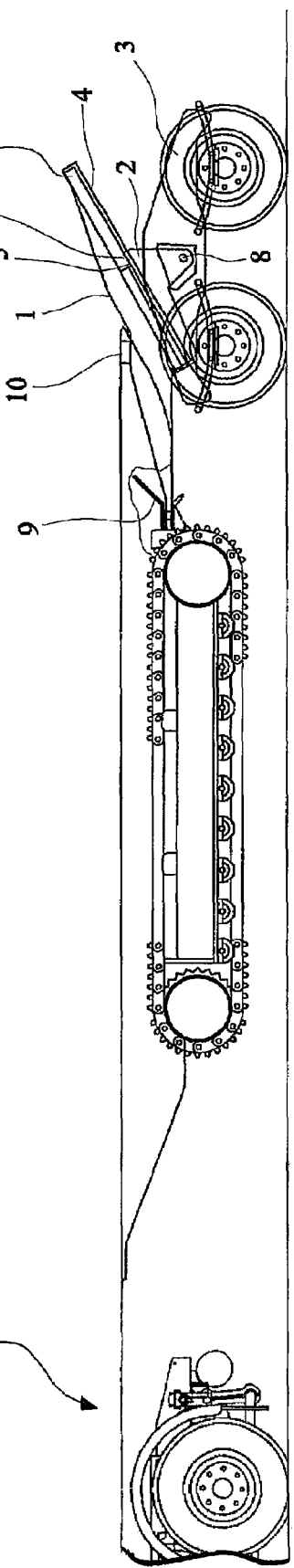
FIG. 4
FIG. 5

BOGIE UNIT FOR SUSPENDED TRANSPORT OF A TREATMENT PLANT

This invention relates to a bogie unit for suspended transport of a treatment plant, such as a self-propelled screening and/or crushing plant.

A heavy duty piece of equipment, such as a mobile screening and/or crushing plant, presents serious handling and transport problems, when the equipment is required to be moved along the public highway, from site to site, or to and from a storage depot. If the equipment is transported on the loading platform of a low loader, then the equipment must be securely fastened in position, bearing in mind that substantial momentum will build-up during transport, and in addition care must be taken to ensure that the overall height of the equipment (when on the low loader) does not exceed minimum bridge heights along the selected route. This may therefore require the equipment to be at least partly dismantled, for transport purposes.

As an alternative to being carried on a low loader, it is known to suspend the equipment between a tractor unit and a trailing bogie unit, so that all three components form an integrated unit or assembly which is able to travel along the public highway. One example of an integrated assembly (comprising a tractor vehicle, a trailing bogie unit and a self-propelled crushing plant suspended therebetween) is disclosed in more detail in WO99/49976.

The present invention is concerned with an improved design of wheeled bogie unit which is engagable with one end of a chassis (or frame) of a treatment plant, in order to suspend that end of the chassis above the ground for the suspended transport of the plant.

According to the invention there is provided a wheeled bogie unit which is engagable with one end of a chassis of a treatment plant, in order to support that end of the chassis above the ground for the suspended transport of the plant, in which the bogie unit comprises:

a chassis;

a least one wheel set supporting the chassis;

a lifting cradle mounted on the chassis and having a projecting end which is engagable with said one end of the plant chassis;

a support and guide surface provided on the projecting end of the cradle and engagable with a lifting surface provided on said one end of the plant chassis, in order to suspend said one end of the plant chassis above the ground; and slide means mounting the cradle on the bogie chassis for relative slidable movement between a lowered position of engagement with said one end of the plant chassis, when the latter is standing on the ground adjacent thereto, and a raised lifting position in which the end of the plant chassis is lifted off the ground and is supported by the support and guide surface of the lifting cradle.

A wheeled bogie unit according to the invention therefore can be located adjacent to a treatment plant which is standing on the ground, and then by applying powered movement to the lifting cradle, one end of the plant chassis can be engaged and then lifted off the ground, and supported by the support and guide surface of the lifting cradle.

The opposite end of the plant chassis may be suspended by a lifting cradle or the like of a further wheeled unit, so that the plant can be suspended between the further wheeled unit and the wheeled bogie unit of the invention. The further wheeled unit may be a tractor unit, provided with a fifth wheel or other type of coupling capable of clamped lifting engagement with the opposite end of the plant chassis.

The lifting cradle is slidably mounted on the chassis, for movement between the lowered position of engagement, and the raised lifting position, and the plane of movement is located at any suitable angle to the horizontal, typically between 30° and 45° to the horizontal.

Any suitable power operated device may be provided, to move the lifting cradle to and fro between its lowered position of engagement, and the lifting position, and may comprise one or more operating cylinder.

The support and guide surface provided on the projecting end of the cradle is arranged to be capable of making progressive sliding and lifting engagement with the lifting surface provided on the end of the plant chassis, and preferably will have a final rest position of abutment with the end of the plant chassis, to provide a stable position of lifting engagement with the end of the plant chassis.

The projecting end of the lifting cradle may have a coupling hitch, by which it may be coupled to a hitching point on the end of the plant chassis, and a pivot coupling pin may be provided in order to couple these components together. This takes place when the lifting cradle has been moved to the lowered position of engagement, and after coupling to the end of the plant chassis, the lifting cradle then moves slidably and relative to the bogie chassis, to take up the raised lifting position. As this relative movement takes place, the wheeled bogie unit moves towards the end of the plant chassis, so that simultaneously the end of the plant chassis is lifted off the ground, and the plant and the wheeled bogie unit move closer together.

The treatment plant which is to be transported in suspended manner using a bogie unit according to the invention can be any large piece of equipment or treatment plant, such as a self-propelled screening and/or crushing plant, and preferably provided with an endless track set to make the plant self propelled on site, after uncoupling from the wheeled bogie unit, and any other wheeled unit from which it is suspended.

A preferred embodiment of wheeled bogie unit according to the invention will now be described in detail, by way of example only, with reference to the accompanying drawings, in which:

FIG. 1 is a side view of a wheeled bogie unit according to the invention, and showing a lifting cradle adjusted to a lowered position ready for engagement with one end of a plant chassis, when the latter is standing on the ground adjacent thereto, prior to relative sliding movement of the lifting cradle in order to lift the plant chassis off the ground, and supported by the lifting cradle;

FIG. 2 is an end view of the wheeled bogie unit shown in FIG. 1;

FIG. 3 is a side view showing initial engagement of the lifting cradle of the wheeled bogie unit with one end of the plant chassis;

FIG. 4 is a similar view showing initial lifting of the end of the plant chassis as the lifting cradle moves relative to the bogie chassis to the raised lifting position, and the bogie unit itself moves towards the plant;

FIG. 5 shows the plant chassis in the fully lifted position, out of contact with the ground.

Figure 6:
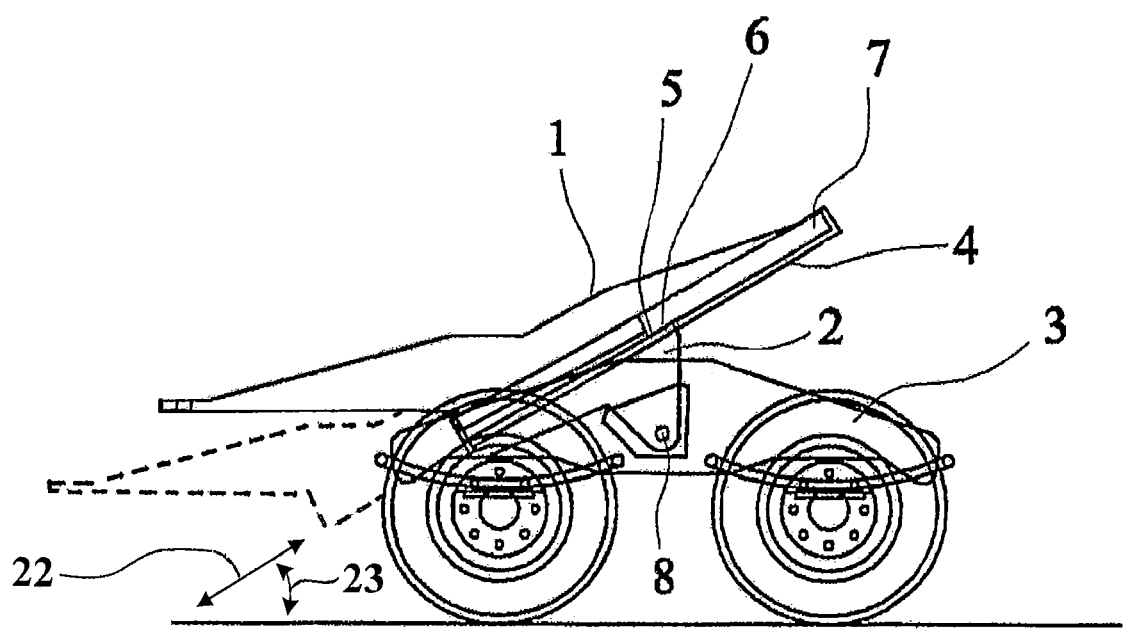
FIG. 6 is a side view of the wheeled bogie unit shown in FIG. 1, and showing the lifting cradle adjusted to a raised lifting position subsequent to relative sliding movement of the lifting cradle to lift the plant chassis off the ground, and supported by the lifting cradle.

Referring now to the drawing, a wheeled bogie unit according to the invention is designated generally by reference 20 and it is intended to suspend one end of the chassis of a treatment plant, for suspended transport of the plant along the public highway. FIG. 1 shows the bogie unit 20 in an adjusted mode, ready for engagement with one end of the plant chassis, and FIGS. 3, 4 and 5 show successive stages of (a) engagement with one end of the plant chassis, (b) initial lifting of that end of the plant chassis and (c) final lifting of the plant chassis to a position suitable for suspended transport along the public highway, as part of an integrated assembly of wheeled supporting units with the plant suspended therebetween.

The bogie unit 20 has a main frame or chassis 3, and at least one set of wheels supporting the chassis 3. In the illustrated embodiment, a tandem arrangement of supporting wheels 11 and 12 is shown. A lifting cradle is mounted on the chassis 3 and takes the form of an arm 1 having a projecting end 13 which is engagable with one end of the plant chassis, as will be described below with reference to FIGS. 3 to 5. The arm 1 has a flat flanged underside 4 (see FIG. 4), and by which it is attached to a pivot bracket 2 by means of spacers 5 and clamping strips 6. The bracket 2 is attached to the chassis 3 of the bogie unit 20 via a pair of pivot pins 8, which allow rotation of the bogie chassis relative to the bracket 2 over a small range of movement, allowing weight when applied to be equally distributed between the two axles of the wheels 11 and 12.

Therefore, slide means is provided which mounts the cradle (arm 1) on the bogie chassis 3 for relative slidable movement between a lowered position of engagement with one end of the plant chassis, as shown in FIG. 3 (when the latter is standing on the ground adjacent thereto), and a raised lifting position in which the end of the plant chassis is lifted off the ground and is supported by the lifting cradle (see FIGS. 4 and 5).

To facilitate the engagement between the projecting end 13 of the arm 1 and the adjacent end of the plant chassis, a profiled support and guide surface 14, 15 is provided on the upper surface of the projecting end 13 of the cradle. The surfaces 14 and 15 are engagable with a lifting surface 16 provided on the end of the plant chassis, in order to suspend the end of the plant chassis above the ground.

FIG. 3 therefore shows a treatment plant, designated generally by reference 17, and having a plant chassis or main frame 18, and which is supported on the ground by an endless track set 19, and which therefore gives the plant 17 a self-propelled capability, when it is required to be manoeuvred on site. FIGS. 1 and 3 shows the lifting cradle adjusted to a lowered position of engagement, whereby the forward end 21 of the projection 13 is coupled with the plant chassis 18 via a pivot coupling 9, as shown in FIGS. 3 to 5.

The lifting cradle (arm 1) is slidably mounted on the chassis 3 for movement between the lowered position of engagement shown in FIGS. 1 and 3, and a raised lifting position as shown in FIGS. 4 and 5. FIG. 6 shows the lifting cradle in the lowered position of engagement (shown in dashed lines) and the raised final or rest position of abutment. The plane of movement 22 of the lifting cradle is located at any suitable angle 23 to the horizontal, typically between 30° and 45° to the horizontal. Any suitable power operated device is provided, to move the lifting cradle to and from its lowered position of engagement, and lifting position, and in the illustrated embodiment comprises one or more operating cylinder 7. FIGS. 1 and 3 show the operating cylinders 7 in a retracted position, but as the cylinders are operated, the piston rods extend and thereby cause relative sliding movement between the chassis 3 and the lifting cradle. As can be seen particularly by comparison of the position of the wheels 11 and 12 between FIGS. 3 and 4, the wheeled bogie unit 20 itself moves bodily towards the plant 17 while the lifting movement takes place. At the same time, the lifting surface 16 of the plant chassis 18 moves slidably over the support and guide surfaces 14 and 15 provided on the projecting end 13 of the cradle, until a final or rest position of abutment is reached, in which the end 10 of the chassis 18 rests on an abutment surface provided by surface 15.

The wheeled bogie unit 20 shown in the drawings is utilised in order to engage, and then lift one end of the plant 17 off the ground. A further wheeled unit, (not shown) is provided, in order to support the opposite end of the plant chassis 18, so that plant 17 can be transported along the public highway as a suspended unit between a pair of wheeled units. The further wheeled unit 24, partially shown in FIG. 5, may comprise another similar wheeled bogie unit similar to unit 20, or may comprise a tractor cab with a fifth wheel or other suitable coupling.

The invention claimed is:

1. A wheeled bogie unit which is engageable with one end of a chassis of a treatment plant, in order to support that end of the plant chassis above the ground for the suspended transport of the plant, in which the bogie unit comprises:
   a bogie chassis;
   a front axle mounting a front wheel set and a rear axle mounting a rear wheel set to support the bogie chassis;
   a lifting cradle mounted on the bogie chassis and having a projecting end which is engageable with said one end of the plant chassis;
   an inclined support and guide surface provided on the projecting end of the cradle and engageable with an inclined lifting surface provided on said one end of the plant chassis, in order to suspend said one end of the plant chassis above the ground;
   a slide arrangement mounting the cradle on the bogie chassis for relative slidable movement along an inclined plane of movement between a lowered position of engagement with said one end of the plant chassis, when the latter is standing on the ground adjacent thereto, and a raised lifting position in which the end of the plant chassis is lifted off the ground and is supported by the inclined support and guide surface of the lifting cradle; and
   a mounting bracket via which the lifting cradle is mounted on the bogie chassis at a position between said front and rear axles, the mounting bracket configured to allow the cradle to pivot relative to the bogie chassis;
   wherein said front and rear wheel sets, via said front and rear axles are configured to support the bogie chassis and bear the weight of the treatment plant at the lower position of engagement and the raised lifting position.

2. The wheeled bogie unit according to claim 1, in which the lifting cradle is slidably mounted on the bogie chassis, for movement between the lowered position of engagement and the raised lifting position.

3. The wheeled bogie unit according to claim 2, wherein said mounting bracket is configured to pivot on the bogie chassis to distribute the weight of the suspended treatment plant between the front and rear axles.

4. The wheeled bogie unit according to claim 3, including spacers and clamping strips which mount an underside of the lifting cradle on the mounting bracket, allowing free lengthwise movement of the cradle relative to the bogie chassis.

5. The wheeled bogie unit according to claim 4, including one or more operating cylinders to act between the mounting bracket and the cradle, to move the cradle relatively between the lowered position of engagement and the raised lifting position, and in which the mounting bracket is capable of carrying out limited pivoting movement, during relative movement of the cradle to the raised lifting position, in order to adjust the weight transfer of the suspended plant, to be split between a pair of wheel sets supporting the chassis.

6. The wheeled bogie unit according to claim 1 and in combination with a further wheeled unit for supporting the opposite end of the plant chassis, in order to suspend the plant for transport therebetween.

7. The wheeled bogie unit according to claim 1 wherein the slide arrangement mounting the cradle moves along the plane of movement in a direction that is between 30° and 45° to the horizontal.

8. A wheeled bogie unit which is engageable with one end of a chassis of a treatment plant, in order to support that end of the plant chassis above the ground for the suspended transport of the plant, in which the bogie unit comprises:
  a bogie chassis;
  a front axle mounting a front wheel set and a rear axle mounting a rear wheel set to support the bogie chassis;
  a lifting cradle mounted on the bogie chassis and having a projecting end which is engageable with said one end of the plant chassis;
  an inclined support and guide surface provided on the projecting end of the cradle and engageable with an inclined lifting surface provided on said one end of the plant chassis, in order to suspend said one end of the plant chassis above the ground; and
  a slide arrangement mounting the cradle on the bogie chassis at a region between said front and rear axles for relative slidable movement along an inclined plane of movement in a direction of between 30° and 45° to the horizontal between a lowered position of engagement with said one end of the plant chassis, when the latter is standing on the ground adjacent thereto, and a raised lifting position in which the end of the plant chassis is lifted off the ground and is supported by the inclined support and guide surface of the lifting cradle, wherein the slide arrangement comprises:
  a mounting bracket via which the lifting cradle is slidably mounted on the bogie chassis at a position between the front and rear axles, the mounting bracket configured to pivot on the bogie chassis and enable the weight of the suspended treatment plant to be distributed between the front and rear wheel sets;
  spacers and clamping strips which mount an underside of the lifting cradle on the mounting bracket, allowing free lengthwise movement of the cradle relative to the bogie chassis; and
  one or more operating cylinders to act between the mounting bracket and the cradle, to move the cradle relatively between the lowered position of engagement and the raised lifting position, and in which the mounting bracket is capable of carrying out limited pivoting movement, during relative movement of the cradle to the raised lifting position, in order to adjust the weight transfer of the suspended plant, to be split between a pair of wheel sets supporting the chassis.

* * * * *